May 11, 1943.  C. WANTZ  2,318,823
SAFETY SHUT-OFF AND CONTROL DEVICE
Filed Jan. 13, 1941   4 Sheets-Sheet 1
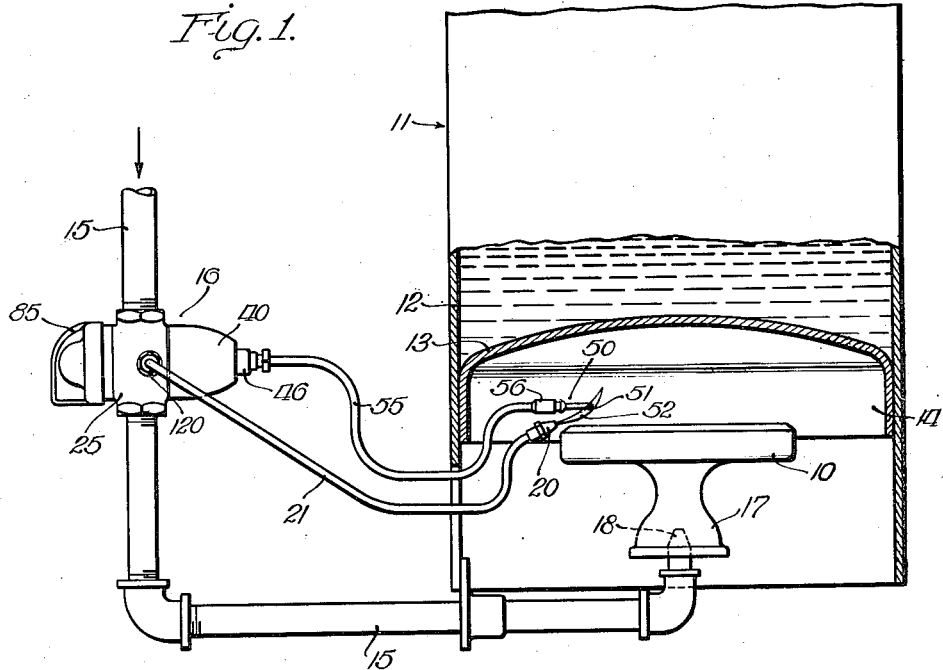
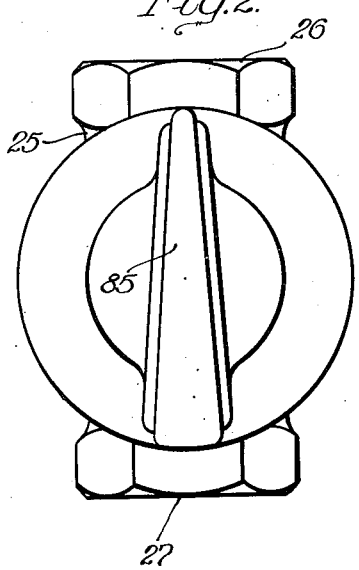
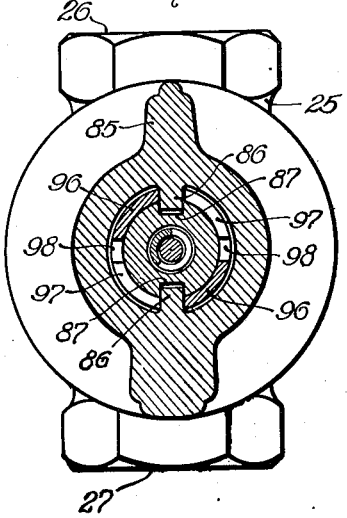
INVENTOR.
Clarence Wantz May 11, 1943.  C. WANTZ  2,318,823
SAFETY SHUT-OFF AND CONTROL DEVICE
Filed Jan. 13, 1941  4 Sheets-Sheet 2
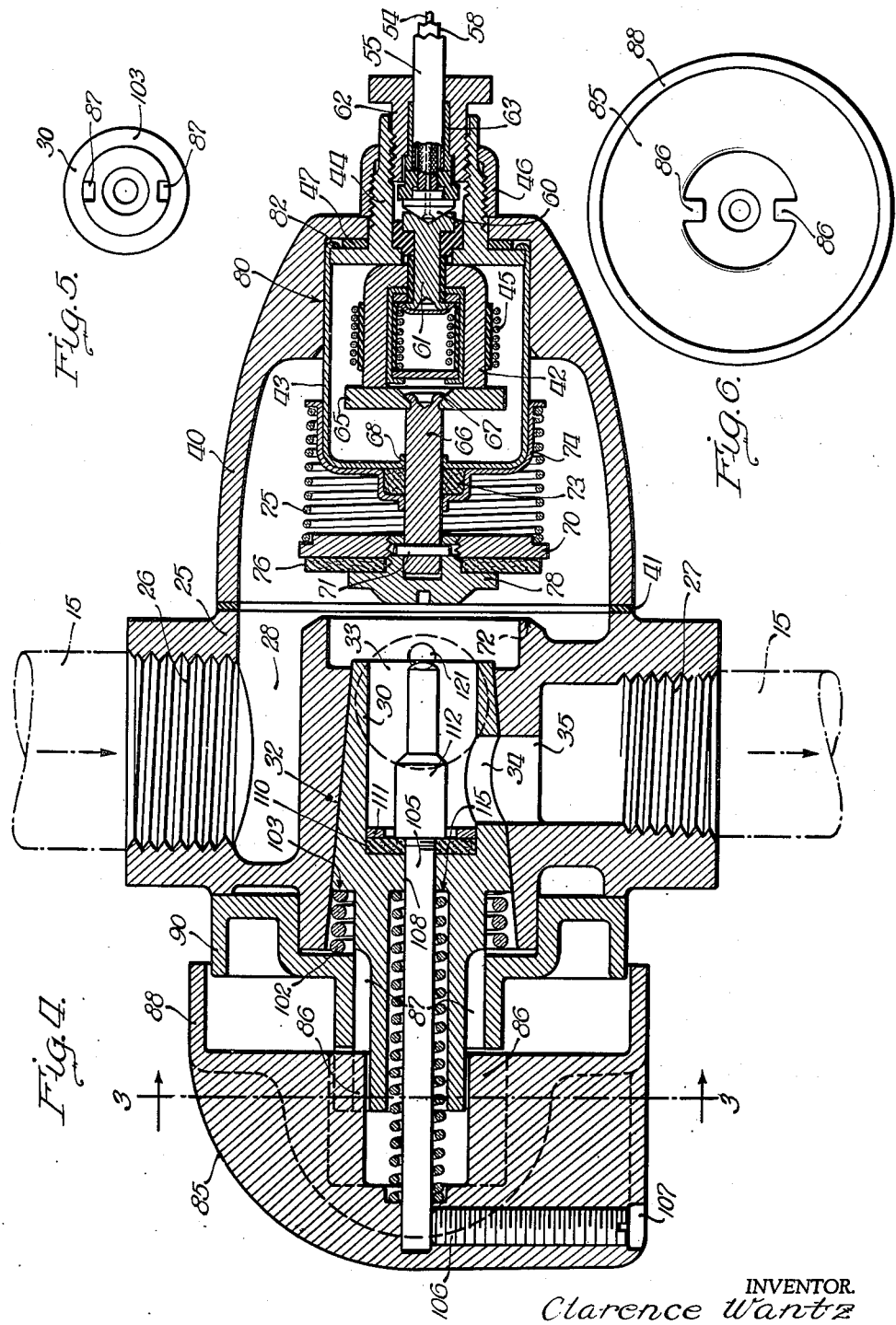
INVENTOR.
Clarence Wantz
BY

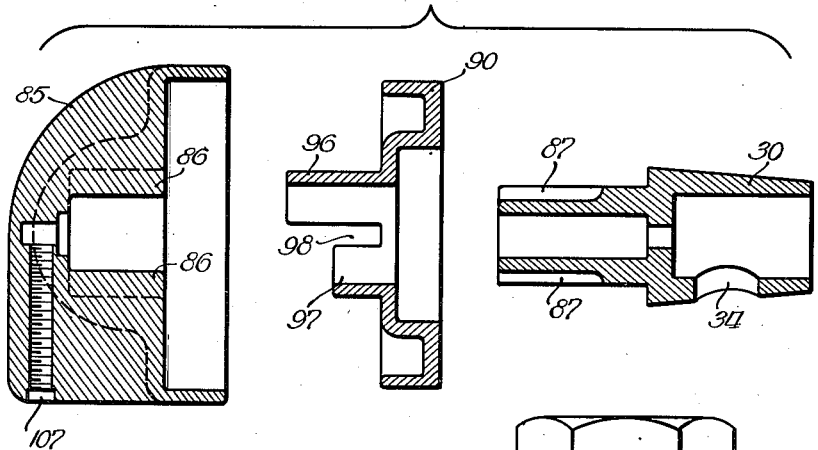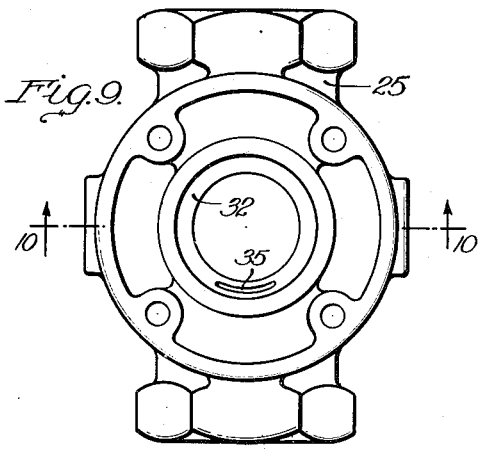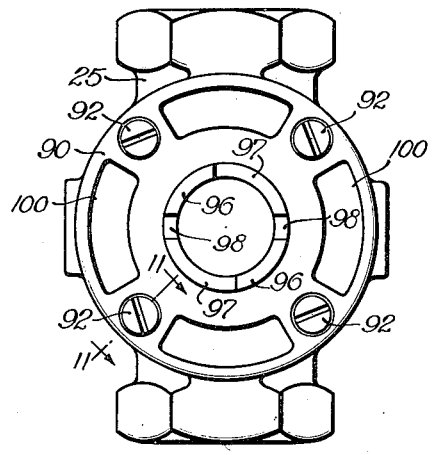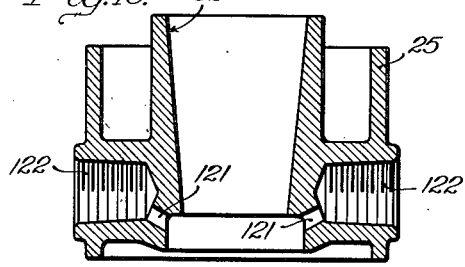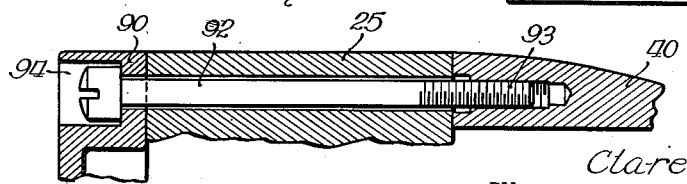

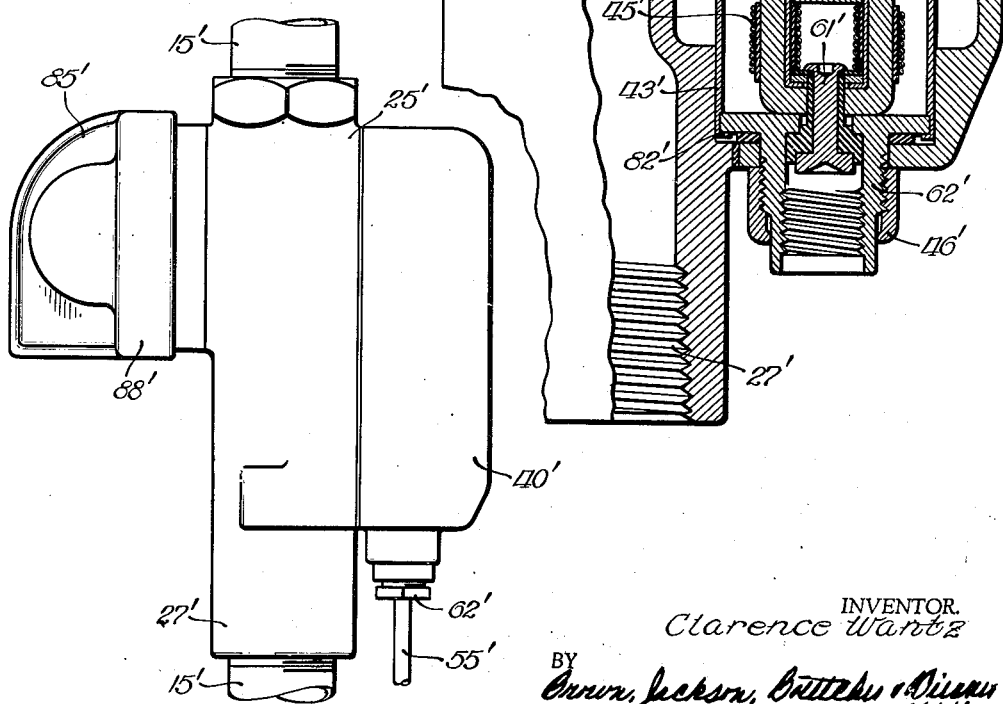

Patented May 11, 1943

2,318,823

UNITED STATES PATENT OFFICE 2,318,823

SAFETY SHUT-OFF AND CONTROL DEVICE

Clarence Wantz, Milwaukee, Wis., assignor to Milwaukee Gas Specialty Company, Milwaukee, Wis., a corporation of Wisconsin Application January 13, 1941, Serial No. 374,237

9 Claims. (Cl. 137—144)

This invention relates to a safety shutoff and control device, and more particularly to a thermoelectric safety shutoff and control device for fuel burners, which device has a valve or other controlling member for controlling the supply of fuel to the burner and a thermoelectric safety shutoff for automatically shutting off the supply of fuel to the burner upon extinguishment of a flame, such, for example, as a pilot flame.

While the particular device selected for illustration employs a thermoelectric safety shutoff valve connected to the armature for the electromagnet for movement to open and closed positions with movement of the armature to attracted and retracted positions, it is to be understood that the invention is not limited to this particular embodiment but may be employed in all similar devices—by way of example, in devices in which the movement of the armature controls a switch connected in circuit with a solenoid or other electroresponsive valve which is operable to open and close the fuel supply line leading to the burner.

Due to the minute character of the maximum E. M. F. that can be generated by the heat of a pilot light or other flame or source of heat on a thermocouple and the inability of this minute thermoelectric current to actuate the safety shutoff means to open or operating position, thermoelectric safety shutoff and control devices of the type to which this invention particularly appertains usually require reset or cocking means for resetting or cocking the armature to attracted position and the valve or other safety shutoff to open or operating position.

Unless means is provided for assuring that the supply of fuel to the burner is shut off during the resetting operation and until the pilot is lighted and has heated the thermocouple sufficiently to hold the shutoff valve in open position, fuel may pass to the burner and collect unburned. This unburned fuel presents the danger of asphyxiation and possible explosion when a flame is applied to light the pilot burner.

One of the main objects of the present invention is to provide, in a thermoelectric safety shutoff and valve or other controlling member combination in which the safety shutoff operates automatically to shut off the supply of fuel upon extinguishment of a flame such, for example, as a pilot flame, or upon other malfunctioning of the apparatus while the valve or other controlling member has an open or operating position and a closed or safety position, means common to both said thermoelectric safety shutoff and said controlling member and adapted to operate said controlling member and to reset said thermoelectric safety shutoff.

In the more limited aspects of the invention, the controlling member is in the form of a valve plug mounted to be turned to its open or operating position and to its closed or safety position, and a handle is provided for rotating the valve to its different positions, this handle also being movable in a direction to reset the thermoelectric safety shutoff to operating position.

Another object of the invention is to provide an improved form of interlocking means which will permit resetting the thermoelectric safety shutoff to operating position only when the valve plug is closed to shut off the supply of fuel to the burner and which will prevent movement of the valve plug to open position when the reset means is in resetting position.

It is also an object of the invention to provide a combined safety shutoff and control device of relatively simple and inexpensive construction, and of unitary character, and adapted to be installed and operated conveniently and effectively; also a device of this character which is composed of relatively few parts and which is adapted for convenient and expeditious manufacture and assembly.

While the particular structural features by which I obtain a device of the character set forth are important features within the more specific aspects of the invention, it is to be understood that the precise features shown and described may be varied within the broader aspects of the invention.

In order to acquaint those skilled in the art with the manner of constructing and operating a device in accordance with the present invention, I will now describe in connection with the accompanying drawings certain preferred embodiments of the invention.

In the drawings:

Figure 1 is a fragmentary vertical section through a water heater, showing one illustrative embodiment of the invention in connection therewith;

Figure 2 is an end view of the safety shutoff and control device;

Figure 3 is a detail section taken on the line 3—3 of Figure 4;

Figure 4 is an axial section through the safety shutoff and control device on an enlarged scale;

Figure 5 is an end view of the rotatable valve plug, taken from the outer end;

Figure 6 is an end view of the operating handle, taken from the inner end;

Figure 7 is an exploded view showing, in axial section, the operating handle, the lock plate, and the rotatable valve plug;

Figure 8 is an end view of the valve body of the safety shutoff and control device, looking from the outer end as the same is viewed in Figure 4 and with the lock plate in place;

Figure 9 is an end view of the valve body of the safety shutoff and control device, looking from the outer end, with the lock plate removed;

Figure 10 is a fragmentary axial section through a portion of the valve body of the safety shutoff and control device, taken on the line 10—10 of Figure 9;

Figure 11 is a fragmentary detail section showing the means for clamping the lock plate and the hood of the safety shutoff and control device to the valve body, and taken on the line 11—11 of Figure 8;

Figure 12 is a view similar to Figure 4 through another embodiment of the invention; and Figure 13 is a side view of the safety shutoff and control device shown in section in Figure 12.

Referring now to the drawings, the burner 10 shown in Figure 1 is any suitable or preferred main burner, such as the burner of a room or space heater, water heater, floor furnace, oven burner, top burner, or any other burner.

For purposes of illustration, a hot water heater is illustrated generally at 11 in Figure 1, this hot water heater comprising a tank 12 adapted to contain the water to be heated. The tank 12 is shown as having a bottom 13 forming the top wall of a heater chamber 14 in which is disposed the main burner 10.

The main burner 10 is supplied with fuel by a pipe 15 which is connected to the burner through the body of the safety shutoff and valve or control device, as will presently appear; the safety shutoff and valve or control device being indicated in its entirety at 16. Where the burner is a gas burner, the fuel supply pipe supplies gas thereto and, in that case, the fuel supply pipe is preferably connected to the burner 10 through a suitable air and gas admixture chamber 17, the fuel delivery nozzle being indicated at 18.

Figure 1 shows a pilot burner 20 associated with or in juxtaposition to the main burner 10. The pilot burner is intended to provide a pilot light for lighting the main burner. A pilot supply pipe 21, connected, for example, to the body of the safety shutoff and valve or control device as will hereinafter appear, or to the fuel supply line otherwise as desired, supplies gaseous fuel to the pilot burner 20.

The combined thermoelectric safety shutoff and valve or control device 16 comprises a valve body 25 having an inlet 26 and an outlet 27. Contiguous sections of the fuel supply pipe 15 are connected to the inlet 26 and outlet 27. The inlet 26 opens into an inlet chamber 28. The control valve or controlling member is in the form of a truncated conical plug 30 seated for rotation in a corresponding conical bore 32 in the valve body 25. The plug 30 is open at its inner end at 33 to receive fuel from the inlet chamber 28, and has a lateral opening or port 34 which is adapted to be moved, by rotation of the plug, into and out of register with a port 35 which opens into the outlet 27.

A hood 40 is secured, by bolts or other suitable means, as will hereinafter appear, to the valve body 25. This hood 40 is shown as supporting the electromagnet assembly and magnet and armature housing structure. A sealing gasket or washer is preferably provided at 41.

The electromagnet comprises a generally U-shaped magnet frame 42 positioned within a magnet housing 43 which seals the magnet and armature from the fuel and other matter that might act deleteriously thereon. The magnet frame 42 is secured to a terminal bushing 44, for example, in the manner more fully disclosed in the copending application of Richard K. Engholdt, Serial No. 328,923, filed April 10, 1940. The coil 45 of the electromagnet is wound around the legs of the magnet frame 42. The bushing 44, the shank of which extends through an opening in the outer end of the hood 40, is shown as externally threaded for threaded engagement with a nut 46 by means of which the bushing 44 is clamped to the outer end of the hood 40. A sealing gasket 47 is preferably placed between the headed inner end of the bushing 44 and the outer end of the hood 40.

A thermocouple, indicated at 50, is placed in position so that the hot junction 51 thereof will be heated by the pilot flame 52 as long as the pilot flame is burning. The thermocouple and leads therefor may be similar to the thermocouple and leads more fully disclosed in Oscar J. Leins Patent No. 2,126,564, granted August 9, 1938, or the thermocouple and leads may be of any other suitable or preferred form.

For the purpose of the present description suffice it to state that the particular thermocouple selected for illustration comprises an outer tubular metallic thermocouple element and an inner metallic thermocouple element of different thermoelectric characteristics. The inner thermocouple element is joined at one end to the outer end of the outer thermocouple element to form the thermojunction 51 which is placed in position to be heated by the pilot flame 52. An inner lead conductor 54 is joined to the inner thermocouple element to form an internal thermojunction, and an outer tubular lead conductor 55 surrounds the inner lead conductor and is connected to the outer thermocouple element, for instance through a sleeve 56, to form a third thermojunction. The inner lead conductor 54 is insulated from the outer lead conductor 55, for instance, by a wrapping of insulation 58 on the inner lead conductor.

A quick detachable or removable connection is preferably provided between the electromagnet of the safety shut-off and control device and the ends of the leads 54 and 55 opposite the ends which are connected to the thermocouple elements. This removable lead connection may be of the form disclosed in the copending application of Richard K. Engholdt above identified, and is illustrated in that form, it being understood that this connection may be of any other suitable or preferred form. Suffice it for purposes of this description to state that the inner lead 54 has a connector cone 60 which seats in the correspondingly recessed outer end of the terminal tip 61 and is clamped in contact therewith by a connector sleeve 62. The adjacent end of the outer tubular lead conductor 55 is connected in circuit with one side of the coil 45 through the connector sleeve 63, sleeve 62, and the bushing 44, and the other side of the coil is connected to the terminal tip 61, the parts being suitably insulated as shown.

The armature 65 is disposed in the armature and electromagnet housing 43, and is adapted to be held in attracted position against the pole ends of the magnet frame 42 as long as the electromagnet is thermoelectrically energized by the heat of the pilot or other flame on the thermocouple. The armature 65 is of disc-like form, and is secured to the outer end of the reciprocatory valve stem 66. The attachment of the armature to the valve stem at 67 is preferably sufficiently loose, as indicated, to permit self accommodation of the armature to the pole ends of the magnet frame by a generally universal movement of the armature upon the outer end of the valve stem. The stem 66 is disposed generally concentrically of the housing 43, and extends inwardly for reciprocating movement through an opening 68 in the inner end of the housing 43.

The safety shutoff valve or controlling member 70 is fixed, for example, by a pin 71 upon the inner end of the valve stem 66, preferably for some relative movement thereon, so as to have self-accommodating seating engagement with the cooperating valve seat 72 in the valve body 25. Packing 73 of felt or other suitable or preferred material is preferably interposed between the inner end of the housing 43 and a valve spring seating member 74 which fits over the inner end of the housing 43.

The valve spring 75 is in the form of a coiled compression spring, interposed between the safety shutoff valve member and the flange at the outer end of the spring seating member 74, and centered, if desired, as shown. The spring 75 resiliently moves the armature 65 to retracted position and the shutoff valve member 70 into seating engagement with the valve seat 72 to shut off the flow of fuel when the electromagnet is deenergized. The valve member 70 is preferably provided with a valve gasket or yielding valve facing 76 secured in place by a suitable screw 78, or in any other suitable manner, and adapted to engage the valve seat 72 when the safety shutoff valve is closed. The outer end of the magnet housing 43 fits telescopically at 80 into the outer end of the hood 40, and its outer end is peened, at 82, over the flange at the inner end of the terminal bushing 44.

For the purpose of rotating the valve plug 30 to position the port 34 fully in register with the port 35 and fully out of register with said port 35, and, if desired, to intermediate positions, the outer end of the plug 30 is provided with a handle piece or knob 85. This handle 85 has a pair of diametrically opposite and parallel longitudinal ribs or projections 86 which are in slidable engagement at all times with two diametrically opposite and parallel longitudinal grooves 87 in the outer end of the stem-like portion of the valve plug 30. The handle 85 is thus fixed against rotation relative to the plug 30, so that when the handle is turned, the valve plug 30 will turn therewith.

The handle 85 has an annular rim 88, and a lock plate 90 is secured to the adjacent end of the valve body 25. As illustrative of one suitable means for securing the lock plate 90 and hood 40 to opposite ends of the valve body 25, through bolts 92 (Figure 11) have heads engaging the lock plate 90 and shanks extending through openings in the valve body 25 and in threaded engagement at 93 with the inner end of the hood 40. The heads of the bolts 92 are shown as countersunk into the lock plate 90 at 94. The bolts 92 secure the lock plate 90 fixedly against turning movement relative to the valve body 25 and against separation therefrom.

The lock plate 90 has two pairs of diametrically opposite hub-like projections 96, 96, and 97, 97, each of arcuate form about a common axis in transverse section, as shown in Figure 8. Diametrically opposite and parallel longitudinal recesses or ways 98, one between one projection 97 and the adjacent projection 96 at one side of the axis of the valve body, and the other between the other projection 97 and the adjacent projection 96 at the other side of the valve body, are adapted, when the plug 30 is in closed position, to receive the ribs or projections 86 on the handle 85 and to permit axial movement of the handle with the ribs or projections 86 sliding in the recesses 98.

The projections 96 are longer than the projections 97, extending outwardly beyond the outer ends of the projections 97, so that when the handle 85 is in its outwardly projected position shown in Figure 4, with the ribs or projections 86 withdrawn from the recesses 98, the handle may be turned a predetermined distance (90 degrees in the illustrated embodiment of the invention) and, at the same time, the outwardly extending ends of the projections 96 will stop or limit the turning movement of the handle in one direction at full open position of the valve plug 30, and in the opposite direction at full closed position of the valve plug. The lock plate 90 may have arcuate openings 100 between the bolts 92.

A coiled spring 102, encircling the stem portion of the plug 30 and interposed between the lock plate 90 and a shoulder 103 on the valve plug 30, acts to maintain the conical surface of the plug 30 resiliently and, at the same time, tightly seated in the bore 32.

For the purpose of resetting the armature 65 to attracted position and the safety shutoff valve 70 to open position, a reset stem 105 is mounted for reciprocatory movement axially in the valve plug 30. The axis of the reset stem 105 coincides with the axis of the plug 30. The outer end of the stem 105 is secured fixedly in the handle 85 by a set screw 106, preferably headless as shown, and the handle 85 preferably has a recess 107 at the outer end of the screw 106. The reset stem 105 is guided at 108 in the plug 30, and the opening in the plug 30 through which the stem 105 extends is sealed by suitable packing 110. A packing washer is provided at 111, and with the reset stem in its outwardly projected position as shown in Figure 4, the packing is engaged and held tightly about the stem by an abutment sleeve 112 threaded onto the stem 105.

A reset spring 114 is coiled about the stem 105 and interposed between the shoulder 115 on the plug 30 and the handle 85. This spring 114 is compressed in moving the handle 85 inwardly to actuate the reset stem axially inwardly to reset the shutoff device, and when the handle 85 is released upon completing the resetting operation, the spring 114 returns the handle and reset stem to their outwardly projected positions as shown in Figure 4.

In the illustrated embodiment of the invention, the tube or pipe 21 for supplying fuel to the pilot burner 20 is connected through a suitable connector fitting 120 with either one of two diametrically opposite pilot supply ports 121, 121, and thereby with the interior of the valve body 25. The ports 121, 121 are shown positioned posterior of the valve seat 72, so that when the shutoff valve 70 is seated on the valve seat 72, it shuts off not only the supply of fuel to the main burner, but also the supply of fuel to the pilot burner. This may vary within the scope of the present invention. At the same time, the ports 121, 121 are anterior of the place where the plug 30, when in closed position, operates to shut off the supply of fuel to the main burner so that the plug 30 may be operated to shut off the supply of fuel to the main burner without shutting off the supply of fuel to the pilot burner.

It is understood, of course, that the outlet 122 for the port 121, to which the pilot supply tube 21 is not connected, is closed by a suitable plug or closure (not shown). The connection through which fuel is supplied to the pilot burner may be provided with means for adjusting or shutting off the supply of fuel to the pilot burner.

The operation of the device is as follows:

When the pilot light is burning, the heat thereof upon the thermojunction 51 produces a thermoelectric current in the coil 45. The magnet frame 42 and armature 65 are preferably formed of an alloy of relatively low magnetic reluctance, and, as a result, the minute or relatively weak thermoelectric current produces a magnetic field of sufficient strength so that when the armature 65 is placed in attracted position by pushing the handle 85 inwardly, the magnetic attraction holds the armature in attracted position against the magnet frame with a force greater than the force exerted by the spring 75, thereby holding the safety shutoff valve 70 in open position as long as the pilot flame is burning.

If the pilot flame is extinguished, the holding action of the electromagnet ceases to be sufficient to hold the armature 65 in attracted position and the shutoff valve 70 in open position, and the spring 75 moves the valve 70 to closed position against the seat 72 to shut off the supply of fuel both to the main burner and to the pilot burner. The armature 65 moves to retracted position with the movement of the valve 70 to closed position.

When it is desired to reset the device, the handle 85 is grasped and turned to turn the valve plug to closed position with the port 34 completely out of register with the port 35. This is necessary because, with the valve plug 30 completely or partially open, the projections 96 on the lock plate 90 lie in the path of the ribs 86 on the handle and obstruct or prevent inward resetting movement of the handle. With the valve plug 30 in closed or shut-off position, the ribs 86 register with the recesses 98 in the lock plate 90 so that the handle 85 may be pressed inwardly, the ribs 86 sliding in the recesses 98.

With the valve plug 30 so positioned, inward movement of the handle 85 moves the reset stem 105 axially inwardly, bringing it into engagement with the screw 78 and moving the armature 65 to attracted position and the shutoff valve 70 to open position. The closed position of the valve plug 30 shuts off the supply of fuel to the main burner during the resetting operation, but as soon as the shutoff valve 70 is opened in the resetting operation a supply of fuel is set up through the port 121 and the connected tube 21 to the pilot burner.

If the pilot burner is lighted and sets up a thermoelectric current to hold the armature in attracted position and the shutoff valve 70 in open position, the shutoff valve 70 will remain open, and when the handle 85 is released, the spring 114 returns the handle 85 and reset stem 105 to their outwardly projected positions as shown in Figure 4. The plug or cock 30 may then be rotated to open the port 34 to the outlet 27 in order to supply fuel to the main burner. If the pilot burner is not lighted to produce the thermoelectric current for holding the shutoff valve 70 open, this valve will move to closed position upon release of the handle 85. Moreover, with the handle 85 pressed inwardly or in its resetting position, the engagement of the ribs 86 in the recesses 98, and particularly with the projections 96, locks the handle to the lock plate 90 so that the handle 85 and the connected plug 30 cannot be turned to set up a supply of fuel to the main burner.

In order to turn on or shut off the supply of fuel to the main burner with the pilot light burning and the armature 65 held in attracted position and with the shutoff valve 70 in open position, the handle 85 is grasped and turned to rotate the plug 30 to bring the port 34 into and out of register with the port 35. With the port 34 in complete register with the port 35 as shown in Figure 4, the device is completely open for maximum supply of fuel to the main burner. By rotating the plug 30 until the port 34 is completely out of register with the port 35, the supply of fuel through the outlet 27, and thereby the supply of fuel to the main burner, is completely shut off. Intermediate supplies of fuel through the outlet 27, and thereby to the main burner, are provided by intermediate amounts of registration of the port 34 with the port 35.

In the embodiment of the invention illustrated in Figures 12 and 13, parts corresponding with the parts shown in Figures 1 to 11, inclusive, are designated by primed reference characters corresponding with the reference characters used in Figures 1 to 11, inclusive.

The embodiment of the invention shown in Figures 12 and 13 is similar to the previously described embodiment of the invention except that in Figures 12 and 13 the axis of the thermoelectric safety shutoff device, including the shutoff valve 70', armature 65', magnet frame 42', spring 75', and the quick detachable or removable terminal connection for the thermocouple, is disposed at right angles to the axis of rotation of the valve plug 30' instead of coaxial therewith as in the preceding embodiment of the invention.

The outer end of the reset stem 105' is secured fixedly to the handle 85' by a screw 106' disposed axially with respect to the stem 105' instead of at right angles thereto. The inner end of the stem 105' is threaded into a connector member 140 formed at 141 to engage the packing 110' and press the same tightly about the stem 105' when this stem is in its outwardly projected position as shown.

The annular wall, at the inner end of which the valve seat 72 is provided in the previous embodiment of the invention, is extended inwardly, and its inner end is closed by a closure member 142. A sealing gasket may be provided at 143. The inner open end of the plug 30' is placed in communication with the chamber 28' when the safety shutoff valve 70' is open through a valve opening 144. The axis of this opening 144 is at right angles to the axis of the plug 30, and it has a surrounding valve seat 145 against which the yielding facing 76' of the valve 70' is adapted to seat to shut off the supply of fuel.

Secured to the connector member 140 is a flexible actuator 148 which may be of the character of the cable portion of a Bowden wire. This flexible actuator 148 is guided in an arcuate groove 150 in the inner end of the closure member 142. When the handle 85' is moved inwardly after turning the plug 30' to closed position as in the preceding embodiment of the invention, the reset stem 105' moves axially inwardly, forcing the connected end of the flexible actuator 148 inwardly and, thereby, the opposite end of the flexible actuator 148 out at right angles to engage the screw 78' and move the safety shut-off valve 70' to open position and the armature 65' to attracted position. Otherwise the operation is the same as described in connection with the preceding embodiment of the invention and, therefore, will not be repeated.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In a device of the class described, a first valve member, an electromagnet, an armature for said electromagnet which, when attracted, holds said first valve member in open position, said first valve member being operable to closed position when said armature is retracted, a rotatable valve plug for controlling the flow through said device, reset means mounted for reciprocatory movement in said valve plug and operative to reset said armature to attracted position and said first valve member to open position, a handle fixed on the valve plug to turn the valve plug when the handle is turned and slidable along the valve plug to actuate said reset means, and means for preventing sliding movement of the handle along the valve plug except when said valve plug is in closed position.

2. In a device of the class described, a first valve member, an electromagnet, an armature for said electromagnet which, when attracted, holds said first valve member in open position, said first valve member being operable to closed position when said armature is retracted, a rotatable valve plug for controlling the flow through said device, reset means mounted for reciprocatory movement in said valve plug and operative to reset said armature to attracted position and said first valve member to open position, a handle fixed on the valve plug to turn the valve plug when the handle is turned and slidable along the valve plug to actuate said reset means, and means cooperating with said handle to limit rotation of said valve plug and to prevent sliding movement of the handle along the valve plug except when the valve plug is in closed position.

3. In combination, a rotatable valve plug, a stem mounted for reciprocatory movement in said valve plug, and a handle fixed on the valve plug to turn the valve plug when the handle is turned and slidable bodily and in a rectilinear direction along and relative to the valve plug to actuate said stem.

4. In combination, a valve body, a valve plug rotatable in said valve body, a stem mounted for reciprocatory movement in said valve plug, a handle fixed on the valve plug to turn the valve plug when the handle is turned and slidable along the valve plug to actuate said stem, and a lock plate secured to the valve body in position between the handle and the valve body and having means for interlocking engagement with means on said handle to prevent sliding movement of the handle along the valve plug except when said valve plug is in closed position and operable to prevent rotation of the handle when the handle is moved along the plug to actuate said stem.

5. In combination, a valve body, a safety shut-off valve in said valve body, an electromagnet, an armature for said electromagnet which, when attracted, holds said safety shutoff valve in open position, a valve plug rotatable in said valve body, a stem mounted for reciprocatory movement in said valve plug for resetting said safety shutoff valve to open position and said armature to attracted position, a handle fixed on the valve plug to turn the valve plug when the handle is turned and slidable along the valve plug to actuate said stem, and a lock plate secured to the valve body in position between the handle and the valve body and having means for interlocking engagement with means on said handle to prevent sliding movement of the handle along the valve plug except when said valve plug is in closed position and operable to prevent rotation of the handle when the handle is in resetting position.

6. In combination, a valve body, a safety shut-off valve in said valve body, an electromagnet, an armature for said electromagnet which, when attracted, holds said safety shutoff valve in open position, a valve plug rotatable in said valve body, a stem mounted for reciprocatory movement in said valve plug for resetting said safety shutoff valve to open position and said armature to attracted position, a handle fixed on the valve plug to turn the valve plug when the handle is turned and slidable along the valve plug to actuate said stem, and a lock plate secured to the valve body in position between the handle and the valve body and having means for interlocking engagement with means on said handle to prevent sliding movement of the handle along the valve plug except when said valve plug is in closed position and operable to prevent rotation of the handle when the handle is in resetting position, said reciprocatory stem being in position coaxial with said safety shutoff valve and said armature.

7. In combination, a valve body, a safety shut-off valve in said valve body, an electromagnet, an armature for said electromagnet which, when attracted holds said safety shutoff valve in open position, a valve plug rotatable in said valve body, a stem mounted for reciprocatory movement in said valve plug for resetting said safety shutoff valve to open position and said armature to attracted position, a handle fixed on the valve plug to turn the valve plug when the handle is turned and slidable along the valve plug to actuate said stem, a lock plate secured to the valve body in position between the handle and the valve body and having means for interlocking engagement with means on said handle to prevent sliding movement of the handle along the valve plug except when said valve plug is in closed position and operable to prevent rotation of the handle when the handle is in resetting position, said reciprocatory stem being positioned with its axis at substantially right angles to the axis of said safety shutoff valve and armature, and a flexible actuator for transmitting resetting movement from said reciprocatory stem to said safety shut-off valve and armature.

8. In a device of the class described, in combination, means comprising an armature and an electromagnet effective when energized for holding said armature in attracted position but ineffective to move said armature to attracted position, a shutoff valve member connected to said armature to be held in open position when said armature is in attracted position and released for movement to closed position upon movement of said armature to retracted position, said armature having generally rectilinear movement to attracted and retracted positions and said shutoff valve member having generally rectilinear movement to open and closed positions, a second valve member rotatable to open and closed positions, a handle common to both said shutoff valve member and said second valve member and mounted for rectilinear movement to reset said armature to attracted position and said shutoff valve member to open position, said handle also having turning movement operable to rotate said second valve member to open and closed positions, and means for preventing rectilinear movement of said handle except when said second valve member is in substantially closed position, said last means comprising internal longitudinally extending rib means carried by said handle, and a member having longitudinally extending groove means registering with said rib means only when said second valve member is in substantially closed position.

9. In a device of the class described, in combination, a valve body having a tapered bore, a rotatable valve plug member seated in said bore and having an outwardly extending stem, the extending stem of said plug member having longitudinally extending groove means therein, a handle mounted on said stem and having longitudinally extending rib means in sliding engagement at all times with the groove means in said stem, a member positioned between the valve body and said handle and having longitudinally extending groove means registering with the rib means on said handle only when said plug member is in substantially closed position, means comprising an armature and an electromagnet effective when energized for holding said armature in attracted position but ineffective to move said armature to attracted position, and a reset stem secured to said handle and mounted for reciprocatory movement in said valve plug for resetting said armature to attracted position by rectilinear movement of said handle.

CLARENCE WANTZ.